United States Patent
Soltis, Jr. et al.

(10) Patent No.: US 6,651,176 B1
(45) Date of Patent: Nov. 18, 2003

(54) SYSTEMS AND METHODS FOR VARIABLE CONTROL OF POWER DISSIPATION IN A PIPELINED PROCESSOR

(75) Inventors: Donald C. Soltis, Jr., Fort Collins, CO (US); Glenn T. Colon-Bonet, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/457,169

(22) Filed: Dec. 8, 1999

(51) Int. Cl.[7] .............................. G06F 1/26; G06F 15/00
(52) U.S. Cl. ...................... 713/300; 713/322; 712/216; 712/219
(58) Field of Search ................................. 713/340, 324, 713/322, 300; 712/218, 219, 216, 217

(56) References Cited

U.S. PATENT DOCUMENTS

| | | | |
|---|---|---|---|
| 4,644,466 A | * 2/1987 | Saito | 712/218 |
| 5,452,215 A | 9/1995 | Washabaugh | 364/468 |
| 5,521,834 A | 5/1996 | Crafts et al. | 364/489 |
| 5,557,531 A | 9/1996 | Rostoker et al. | 364/489 |
| 5,559,458 A | * 9/1996 | Holler, Jr. | 327/143 |
| 5,666,506 A | 9/1997 | Hesson et al. | 395/392 |
| 5,684,422 A | 11/1997 | Witt et al. | 327/261 |
| 5,751,984 A | 5/1998 | Chang et al. | 395/392 |
| 5,859,999 A | 1/1999 | Morris et al. | 395/565 |
| 5,860,017 A | 1/1999 | Sharangpani et al. | 395/800.23 |
| 5,884,061 A | 3/1999 | Hesson et al. | 395/393 |
| 5,898,235 A | 4/1999 | McClure | 307/64 |
| 5,903,768 A | 5/1999 | Sato | 395/800.01 |
| 5,938,755 A | 8/1999 | Yastrow | 710/300 |
| 5,941,991 A | * 8/1999 | Kageshima | 713/340 |
| 6,122,728 A | * 9/2000 | Leibholz et al. | 712/219 |
| 6,182,232 B1 | * 1/2001 | Klein | 713/340 |
| 6,195,756 B1 | * 2/2001 | Hurd | 713/340 |
| 6,219,723 B1 | * 4/2001 | Hetherington et al. | 710/18 |
| 6,275,928 B1 | * 8/2001 | Arm et al. | 712/219 |
| 6,357,016 B1 | * 3/2002 | Rodgers et al. | 713/601 |
| 6,367,023 B2 | * 4/2002 | Kling et al. | 713/340 |

OTHER PUBLICATIONS

Alexander Wolfe, "Patents shed light on Merced", Electronic Engineering Times, Feb. 15, 1999, pp. 43–44.

* cited by examiner

*Primary Examiner*—Thomas Lee
*Assistant Examiner*—Chun Cao (57) ABSTRACT

The invention controls maximum average power dissipation by stalling high power instructions through the pipeline of a pipelined processor. A power dissipation controller stalls the high power instructions in order to control the processor's maximum average power dissipation. Preferably, the controller is modeled after a capacitive system with a constant output rate and a throttled input rate: the output rate represents the steady state maximum average power dissipation; while the input rate is stalled based upon current capacity, representing thermal response time. At start-up, the capacity is initialized. Yet for each high power instruction, the capacity increases by a weighted value. Each clock capacity is also decreased by a variable output rate. In particular, a low power operation is inserted to the stage execution circuit where the stall is desired, creating a low power state for that circuit. This stall effectively creates a "hole" at that pipeline stage, thus temporarily reducing power dissipation. The invention takes advantage of the fact that the presence of an instruction at any stage execution circuit dissipates power and that the absence (i.e., a "hole") of an instruction at any stage dissipates less power. By controlling where and when a hole occurs within the pipeline, the maximum average power dissipation of the processor is controlled.

18 Claims, 5 Drawing Sheets

SYSTEMS AND METHODS FOR VARIABLE CONTROL OF POWER DISSIPATION IN A PIPELINED PROCESSOR

FIELD OF THE INVENTION

The invention generally relates to control of instructions to a pipelined processor to efficiently limit power dissipation.

BACKGROUND OF THE INVENTION

As used herein, "instructions" denote basic processor commands and other operations such as floating point operations. The following patents provide useful background for the invention, and are thus incorporated herein by reference: U.S. Pat. No. 5,938,755; U.S. Pat. No. 5,903,768; U.S. Pat. No. 5,898,235; U.S. Pat. No. 5,884,061; U.S. Pat. No. 5,751,984; U.S. Pat. No. 5,684,422; U.S. Pat. No. 5,557,531; U.S. Pat. No. 5,521,834; and U.S. Pat. No. 5,452,215;

Modern processors, like the PA-8000 microprocessor by Hewlett-Packard, use "pipelining" to increase throughput at relatively low cost. Pipelining is a technique whereby the processor begins executing a second instruction before the first instruction is completed. Specifically, a pipelined processor partitions a process with "m" steps into "m" hardware stages separated by registers, which hold intermediate results. Each hardware stage thus has a stage execution circuit that performs the actual step or operation. One pipelined stage has one step in the process, and stages are connected in the order that the steps are performed. By permitting each of the "m" stages to operate concurrently, the pipelined process can substantially operate at "m" times the rate of a processor without pipelining. When any stage completes its operation, the result is passed to the next stage; and final results emerge at the end of the pipeline.

Figure 1:
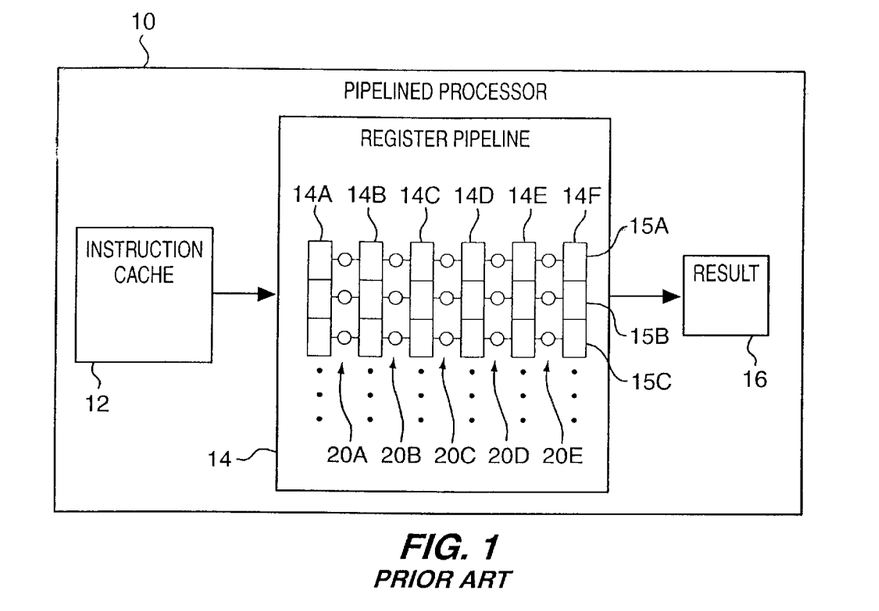
FIG. 1 shows a schematic diagram of select structure within a prior art pipelined processor.
Figure 2:
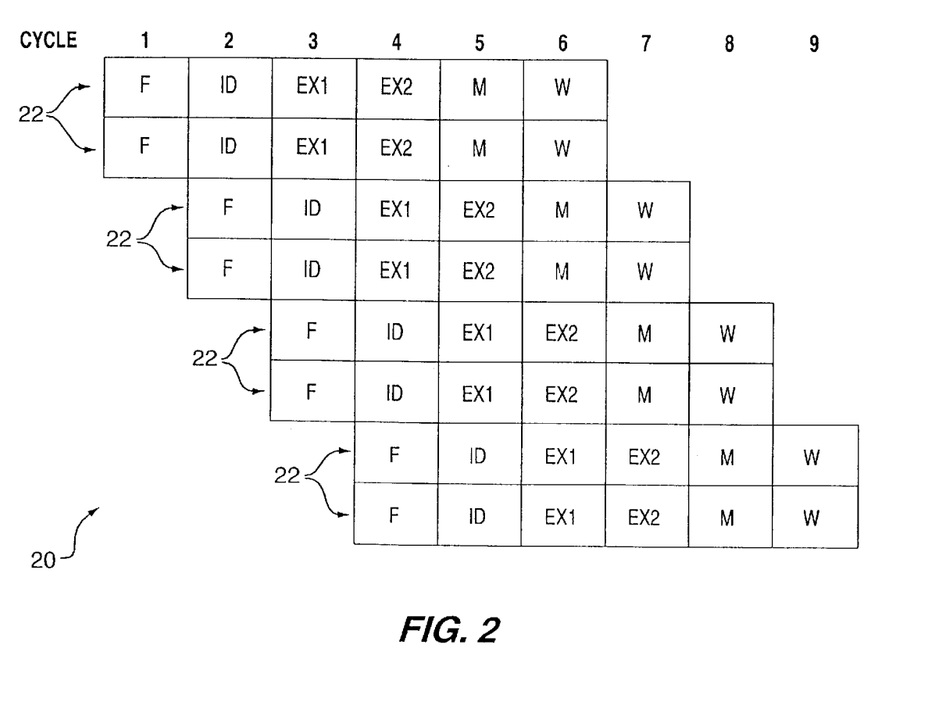
FIG. 2 illustrates a typical 6-stage pipelined process for operation with pipelined processors.

Pipelines are used to accelerate execution by operating on multiple computer instructions at once. FIG. 1 shows relevant structure within one illustrative prior art pipelined processor 10; and FIG. 2 shows an exemplary six-stage pipeline 20. Consistent with later-generation processors, processor 10 issues and retires more than a single instruction 22 per clock cycle, as illustrated in FIG. 2. In the first stage, the fetch (F) stage, processor 10 tells its cache 12 which instruction 22 to next put into register pipeline 14, containing separate register columns 14a–14f and stage execution circuits 20a–20e. Pipeline stages are separated by register columns 14a–f, each holding intermediate results for respective stages of the pipeline. The many outputs of register pipeline 14 are illustratively shown as transferred to a results section 16 within processor 10 for use in further operations.

For illustrative purposes, register columns 14a–f are shown with only three registers each; while the typical length of register columns 14a–14f has many more distinct registers. A particular pipeline process transpires across a particular row of register columns 14a–14f, such as the row of registers 15b. Stage execution circuits 20a–e execute the step or operation between respective register columns 14a–f. Each stage execution circuit 20 dissipates heat associated with the step or instruction being processed at that stage. Certain steps or instructions such as floating point operations dissipate more heat in circuits 20 than other steps or instructions in circuits 20.

The next stage after the F stage is the instruction decode (ID) stage, which might for example indicate an "add" or "subtract" or floating point ("FP") calculation. The ID stage also starts to acquire the operand values from the appropriate register columns 14a–14e.

Instructions are executed at the EX stage, here shown with two separate stages EX1 and EX2. Associated stage execution circuits 20c, 20d serve to process operations associated with these stages.

The memory stage (M) corresponds to a memory operation, if any; and the write stage (W) operates to write the result or float value at the sixth stage of the register pipeline 14. Results that emerge from register pipeline 14 are available to processor 10, illustratively, at result section 16.

Note that as shown in FIG. 2, two instructions 22 are clocked simultaneously for a given cycle. Thus, for example, the first two instructions 22 start at cycle 1 and complete simultaneously at cycle 6.

Those skilled in the art should appreciate that other forms of pipeline processing are known. For example, Hewlett-Packard's PA-8000 processor has a two-level process, with one pipeline for instructions and a separate pipeline for floating point operations. Furthermore, the number of stages in a pipeline also varies. However, the maximum throughput of a single pipeline process is one instruction per cycle.

The afore-mentioned processors are typically at the heart of all personal computers, work stations and servers, i.e., computing "systems". Often, it is desirable to have more than one such processor within a single system. However, one difficulty with adding additional processors within computing systems is in compensating for power dissipation: pipelined processors generate heat, particularly within stage execution circuits 20 and register columns 14a–14f, FIG. 1; and this heat must be dissipated by the system's cooling capabilities or the processor will fail. In the prior art, power dissipation in a pipelined processor is based upon the instantaneous dissipation of specific instructions and pipeline length integrated over time. However, the clock frequency and pipeline lengths are such that instantaneous power is not a good indicator of average power dissipation; and yet this calculated average power dissipation is used to determine the cooling requirements of the prior art system. Accordingly, this calculated average power is essentially a "worst case" power evaluation (i.e., an estimate based on maximal utilization of execution circuit resources) that unnecessarily (a) limits the numbers of processors which can be installed within a system or (b) over-specifies the cooling requirements of a system, adding cost, weight and unnecessary structure to a system. Other prior art methods for controlling pipeline processor power dissipation are also problematic. By way of example, control based on current pipeline snapshot is too reactive for the entire computing system. Control based on extended pipeline information requires significant additional hardware.

The prior art is also familiar with thermal sensors on die, used to monitor heat dissipation; however such sensors are complex and difficult to use in meaningful calculations.

It is, therefore, one object of the invention to provide a pipelined processor which variably dissipates processor power according to the actual processing needs of the computing system. Another object of the invention is to provide methods of controlling power dissipation of a pipelined microprocessing system in a manner that is correlated to the types of operations under process. Still another object of the invention is to provide a method of throttling instructions to a pipeline within a processor in a manner functionally related to the physical heat generated by the processor. These and other objects will become apparent in the description that follows.

SUMMARY OF THE INVENTION

The invention solves the afore-mentioned problems of controlling power dissipation by stalling high power instructions through the pipeline, and with minimal performance impact. In particular, one aspect of the invention provides a pipelined processor with a power dissipation controller that stalls high power instructions in order to control the processor's average power dissipation. In a preferred aspect, the controller is modeled after a capacitive system with a constant output rate and a controlled input rate. The output rate represents the steady state power dissipation; while the input rate is controlled based upon the current capacity, representing thermal response. At start-up, the capacity is zero. Yet for each high power instruction, the capacity increases by a weighted value. Each clock capacity is also decreased by a variable output rate. Stalling of instructions occurs when the capacity exceeds a selected threshold; The invention of this aspect is thus based on a model of a current source feeding a capacitor in parallel with a resistor: the current source models the input rate and is controlled by the voltage across the capacitor, with the resistor modeling the output rate. Those skilled in the art should appreciate that the invention simplifies this model in actual implementation due to complexity and cost.

More particularly, in the preferred aspect of the invention, a low power operation is inserted to the stage execution circuit where the stall is desired, creating a low power state for that circuit. This stall effectively creates a "hole" at that pipeline stage, thus temporarily reducing power dissipation. The invention thus takes advantage of the fact that the presence of an instruction at any stage execution circuit dissipates power and that the absence (i.e., a "hole") of an instruction at any stage dissipates less power. By controlling where and when a hole occurs within the pipeline, the overall power dissipation of the processor is controlled. Technically, the power dissipation within the stage processing circuits is related to the charging and discharging of electrical nodes associated with the stage execution circuits; and the number of nodes that charge or discharge are reduced with an absence of a valid instruction. The invention of one aspect thus injects a low power bit ("lp-bit") at the desired stage execution circuit to reduce the power dissipation associated therewith.

There are several advantages of the invention. Unlike the prior art, code sequences with bursts of high powered instructions followed by sequences of low power instructions may not be throttled at all. If however the sequence of high power instruction is long, these will be throttled at a preset rate; and thus power control over a long period more closely matches the computing system's actual power dissipation needs. Other advantages are also apparent with the invention:

Throttling takes into account the effects of prior executed high power instructions; and thus throttling occurs only when necessary and with minimal performance impact on bursting sequences.

Few resources are needed to implement the invention in hardware; and the user further has a choice to increase or decrease the constants used in feedback with the throttling effects.

Power control more closely matches the thermal response time of the computing system, with a response time many orders of magnitude longer than the pipeline length.

By way of example, consider the operation of the invention with a floating point operation. Floating point operations generate relatively large amounts of power and yet are, in effect, relatively non-critical for typical application software. Accordingly, the invention of one aspect tends to degrade the importance of floating point operations to reduce the number of watts generated by each processor, thereby permitting more processors for a given cooling capacity. The prior art does not operate in such a manner, and rather designs its computing systems to dissipate "worst case" processor-generated power, limiting the number of possible processors that can exist for a given cooling capacity.

In one aspect, the invention provides a method for controlling maximum average power dissipation in a pipelined processor, the processor of the type which processes instructions through pipelined stages, including the steps of: determining a first power dissipation generated by issued instructions; determining a capacity as the first power dissipation subtracted by a bleed rate; comparing the capacity to a predetermined threshold; and stalling instructions at a select stage in the pipelined stages when the capacity exceeds the threshold.

In another aspect, the step of determining a first power dissipation can include multiplying the issued instructions by an issue weight, corresponding to relative power dissipation.

The methods of the invention can also include the step of estimating the issue weight as a function of instruction type. Preferably, the issue weight is greater for instructions which dissipate greater energy within the processor.

In another aspect, the methods of the invention include the step of writing one or more system constants into processor registers prior to the step of determining the first power dissipation, the constants including bleed rate, issue weight, and threshold. These constants preferably provide for system operation with power dissipation controlled to a maximum average power dissipation rate relative to a throttled instruction input rate.

In yet another aspect, the method includes the step of resetting capacity to zero (or any other desired value) prior to processing instructions through the processor.

In another aspect, the step of stalling includes the step of asserting a lp-bit to a stage execution circuit within the processor. In subsequent cycles, the lp-bit is moved to a next stage execution circuit within the pipeline stages.

Alternatively, the method changes a first stage execution circuit to a low power state; and this method step can include the steps of (a) changing the first stage execution circuit out of a lower power state and (b) changing a second stage execution circuit to a low power state, where the second stage execution circuit is an adjacent downstream stage from the first stage execution circuit in the pipeline stages.

In still another aspect, the invention provides a pipelines processor with a register pipeline to process instructions through pipeline stages. The register pipeline has (a) a plurality of registers holding intermediate results between stages and (b) a plurality of stage execution circuits for executing instructions at associated stages. A power dissipation controller changes one or more stage execution circuits to a low power state and stall earlier instructions through the pipeline stages containing the stage execution circuits.

In another aspect, the power dissipation controller performs as a capacitive feedback to provide a maximum average power dissipation rate and a throttled instruction input rate. Register memory stores one or more system constants to provide the capacitive feedback according to internal logic. Preferably, the logic compares an internal threshold to a system capacity, computed as the number of issued instructions multiplied by respective issue weights and subtracted by a bleed rate; and the controller thereafter implements a low power state when the capacity exceeds the threshold.

In one aspect, the power dissipation controller controls maximum average power dissipated by the processor in a time frame that is greater than the pipeline length. In another aspect, the time frame is at least 10^5 greater than the pipeline length.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 3:
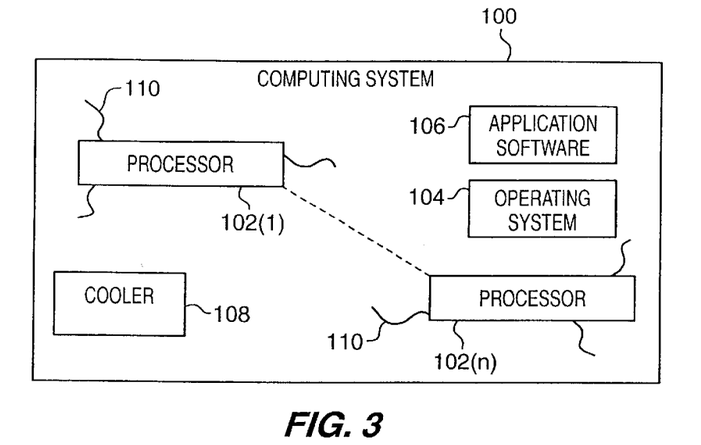
FIG. 3 illustrates a computing system constructed according to the invention.

The invention of one embodiment is shown in FIG. 3, illustrating multiple pipelined processors 102(1) . . . 102(*n*) in a single computing system 100. Computing system 100 and processors 102 are controlled by the operating system manager 104 to collectively process application software 106. The number of processors 102 in system 100 is governed by the cooling capability of cooler 108 in dissipating the heat 110 generated by processors 102. The power dissipation rate to and through processors 102 are set up and governed by system manager 104.

Figure 4:
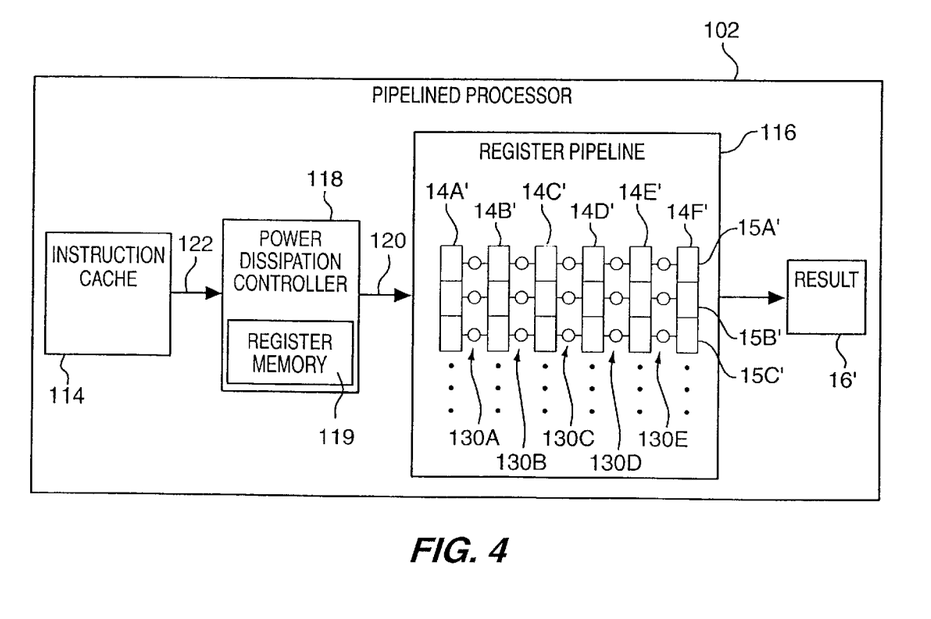
FIG. 4 shows a schematic diagram of a pipelined processor constructed according to the invention.

Each processor 102 is coilfigured with architecture illustrated in FIG. 4 such that maximum average processor-generated power is dissipated at a maximum average output rate, through internal stalling of high power instructions and the injection of low power states into stage execution circuits. Accordingly, system 100 can generally house more processors—and thus provide more parallel processing power—than the computing systems in the prior art, which have poor correlation between cooling requirements and average power dissipation in the processors. The computing system of FIG. 3, on the other hand, throttles high powered instructions through processors 102 such that cooler 108 is matched to the maximum average power dissipation of processors 102, as described in FIGS. 4–6.

For purpose of illustration, other hardware and architecture is not illustrated in FIG. 3, as such hardware and architecture is readily known in the art.

FIG. 4 illustrates further detail of one pipelined processor 102. Like-numbered elements of processor 102, compared to processor 10, FIG. 1, operate in substantially like fashion, as apparent to those skilled in the art. Similar to FIG. 1, processor 102 instructs instruction cache 114 which instructions to put into register pipeline 116; however, unlike processor 10, FIG. 1, this determination is dependent upon the process within power dissipation controller 118. Specifically, controller 118 stalls or "throttles" high power instructions from cache 114 to register pipeline 116 in order to control the power dissipation of processor 102. The stalling is implemented by creating holes within the pipeline at select stage execution circuits 130*a*–130*e*. Holes are preferably generated by injecting lp-bits into the stage execution circuit 130 at a select location such that that stage execution circuit temporarily exists in a low-power state for one cycle.

The above-process can be illustrated in the following table, which illustrates several pipelines, time increasing downwards and pipeline stages in a row:

TABLE I

Example of pipeline process with lp-bit holes

| T | F | ID | EX1 | EX2 | M | W | Stall |
|---|---|----|-----|-----|---|---|-------|
| 1 | F | E | D | C | B | A | 0 |
|   | f | e | d | d | b | a | 0 |
| 2 | F | E | (lp) | D | C | B | 1 |
|   | f | e | (lp) | d | c | b | 1 |
| 3 | G | F | E | (lp) | D | C | 0 |
|   | g | f | e | (lp) | d | c | 0 |
| 4 | H | G | F | E | (lp) | D | 0 |
|   | h | g | f | e | (lp) | d | 0 |

Table I shows a series of two pipelines with two instructions issuing per pipeline. Time is shown increasing with lower pipeline rows. Each letter in Table I indicates a stage operation. The upper case letters indicate the upper pipeline and the lower case letters indicate the lower pipeline. The (lp) annotation refers to a lp-bit insert to set the associated stage execution circuit to a low power state. In this example, the stall is applied to the F and ID stages; and the issue of instructions (e,E) are thus stalled at time 2 in the ID stage. A "hole" is thus created in the pipeline, at stage EX1, where we can insert a low-power state (lp), as indicated. At each subsequent cycle, the hole moves to further stages in the pipeline.

Generally, pipeline stalls apply to a particular stage and all earlier stages. The invention does however contemplate other scenarios. For example, forming an EX1 stall (i.e., insert a lp-bit in EX2, stalling the EX1, ID, and F stages) and a M stall (i.e., insert a lp-bit in W to stall the M, EX2, EX1,ID, and F stages) stalls the F stage if either the EX1 stall or the M stall asserts.

Controller 118, FIG. 4, therefore tags appropriate stage execution circuits 130 with lp-bits to form holes which reduce overall power dissipation of processor 102. Preferably, controller 118 also provides a maximum average rate of powered instructions to pipeline 116 at output 120, while providing a throttled input rate at its input 122. Accordingly, controller 118 behaves much like a capacitive circuit illustrated in FIG. 5. FIG. 4 also shows register memory 119, which stores register write data such as described in FIG. 6.

Figure 5:
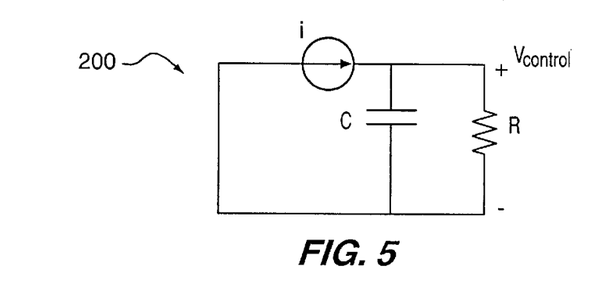
FIG. 5 illustrates an RC circuit which functionally models the time averaging effect achieved by the invention.

In the preferred embodiment, the power dissipation controller 118, FIG. 4, is modeled after RC circuit 200, FIG. 5. Current source i illustrates the power dissipation of the instruction stream; and the RC components perform time averaging of thermal power. Circuit 200 demonstrates that the throttling function of each processor (e.g., pipeline processor 102, FIG. 3) tends to model the thermal energy generated by each processor as opposed to the number of instructions being processed. The number of issued instructions is at least an order of magnitude higher than any significant change in the thermal energy. For example, a typical 500 MHz processor performs billions of operations over the time that the heat generated by the processor changes significantly; and the invention takes advantage of this fact. It is undesirable to actually keep track of the number of high power operations that occur within a processor, as in the prior art; and the invention avoids the need to do so.

Figure 6:
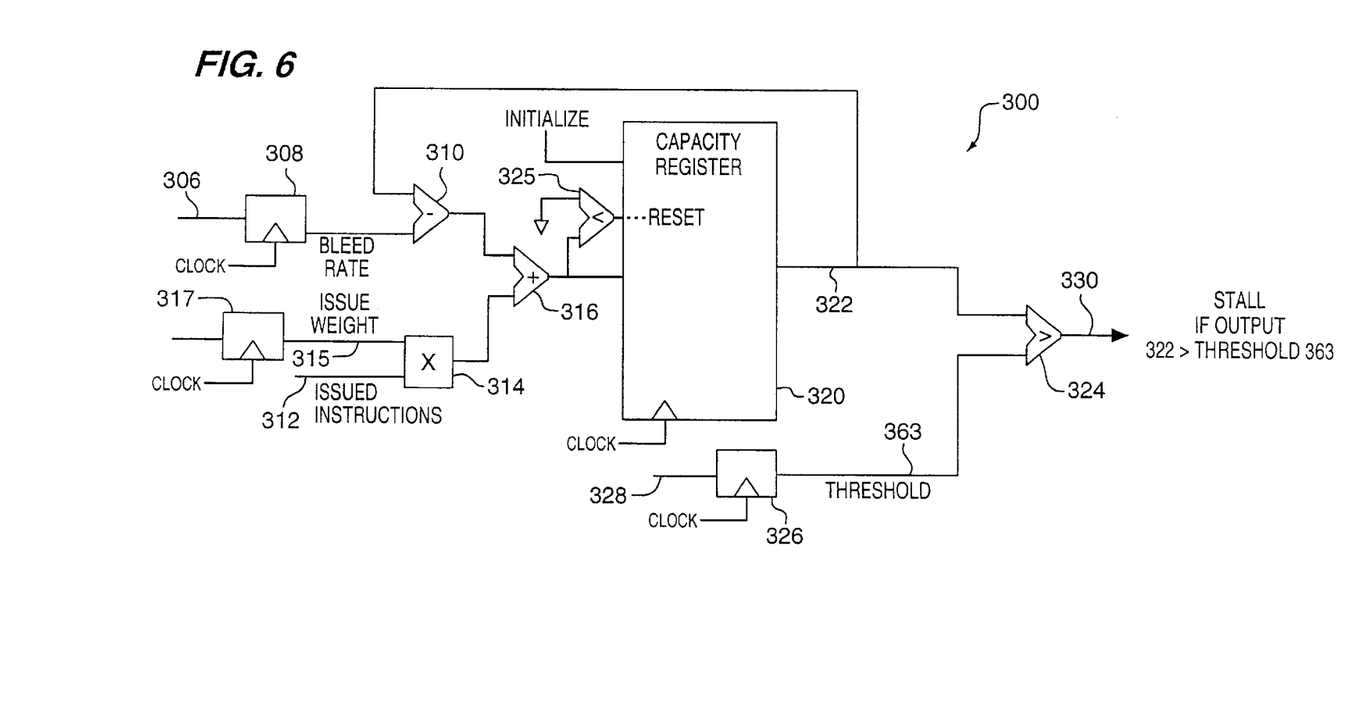
FIG. 6 schematically illustrates internal power dissipation controller architecture, constructed according to the invention, to variably control maximum average power dissipation within a pipelined processor.

FIG. 6 schematically illustrates internal architecture 300 of the power dissipation controller 118, FIG. 4, to variably control maximum average power dissipation of pipelined processor 102. The input to architecture 300 is a register access bus 306 to register 308, corresponding to bleed rate. The capacity output 322 is reduced at each clock cycle by the bleed rate at operator 310; and this new value is increased by a value generated by operator 314 at operator 316. Specifically, each issued instruction (corresponding to recently executed instructions to the processor pipeline) to processor 102 has a value that is input through bus 312; and that value is multiplied by a multiplier at operator 314. The multiplier (issue weight 315) at operator 314 depends upon the type of instruction, and is thus denoted as "issue weight" on bus 315. For example, a floating point instruction may have an issue weight multiplier of 10, while an integer operation may have an issue weight multiplier of 5, roughly corresponding to the power dissipation required for the issued instruction. Through issue weight settings, regulation for power dissipation can be achieved to practically any level.

The value out of operator 316 is issued to capacity register 320. The output 322 of capacity register 320 is then compared to a threshold 363 at comparitor 324. If output 322 is greater than threshold 363, instructions are throttled by an appropriate amount. Threshold 363 corresponds to a value written into register 326 by software, through bus 328, and corresponds to the processor's internal parameters that determine the window within which power dissipation is averaged. Reset 325 sets capacity register 320 to 0 if the new capacity is less than zero at any calculation (see FIG. 7).

Values are inserted and clocked into registers 308, 317, 320 and 326 by known methods, as indicated in FIG. 6. These registers are collectively indicated as register memory 119 in FIG. 4. More particularly, and as described in FIG. 7, the methods of the invention contemplate writing initializing constants into these registers in order to obtain the desired maximum average power dissipation. Thus, for example, issue weight is clocked into register 317, bleed rate is clocked into register 308, and threshold is clocked into register 326, each through system management software 104, FIG. 3. Other values can be inserted within capacity register 320, as desired.

By way of an operable example, issued floating point operations in architecture 300 are multiplied by the issue weight; bleed rate is then subtracted from the current capacity; and these two results are summed to get the new capacity in register 320. If the issue weight for the floating point operation is 10 and the bleed rate is 10, then one floating point operation per stage, on average, occurs across all stages. With two floating point operations, the value at the output of operator 314 is 20. With a threshold of 2000 and the current capacity of 0, for example, either 0, 1 or 2 instructions will then issue. Thus, in this example, either 0, 10 or 20 will be added for each new floating point instruction, and yet 10 is subtracted off due to bleed rate; and capacity is incremented by −10, 0 or 10 at each cycle. If output 330 of architecture 300 designates a stall operation, then no new instructions are taken for that cycle and capacity is decreased by 10.

By way of a further example, consider the first two pipelines of FIG. 2, starting at cycle 1 and ending at cycle 6. In the prior art, if two floating point operations were in these pipelines, and the pipelines were regulated at 50% to control power dissipation, then 50% of the stages are executing at any one time. By comparison, if for example the invention specifies a bleed rate of 50%, and instructions are injected into the pipelines, then the capacity is built to a given threshold before any throttling of the instructions. Therefore, there is no impact to throughput until the threshold is reached and throttling occurs.

Floating point operations tend to occur in bursts, with relatively long periods of inactivity, such as an occurrence where there are two floating operations per cycle in the first two instructions 22 of FIG. 2. This burst-like nature of the floating point operations has little real thermal impact on the pipeline processor, over time; and thus the invention would not regulate throughput until a threshold is reached. If the threshold is not reached, there is no throttling.

Figure 7:
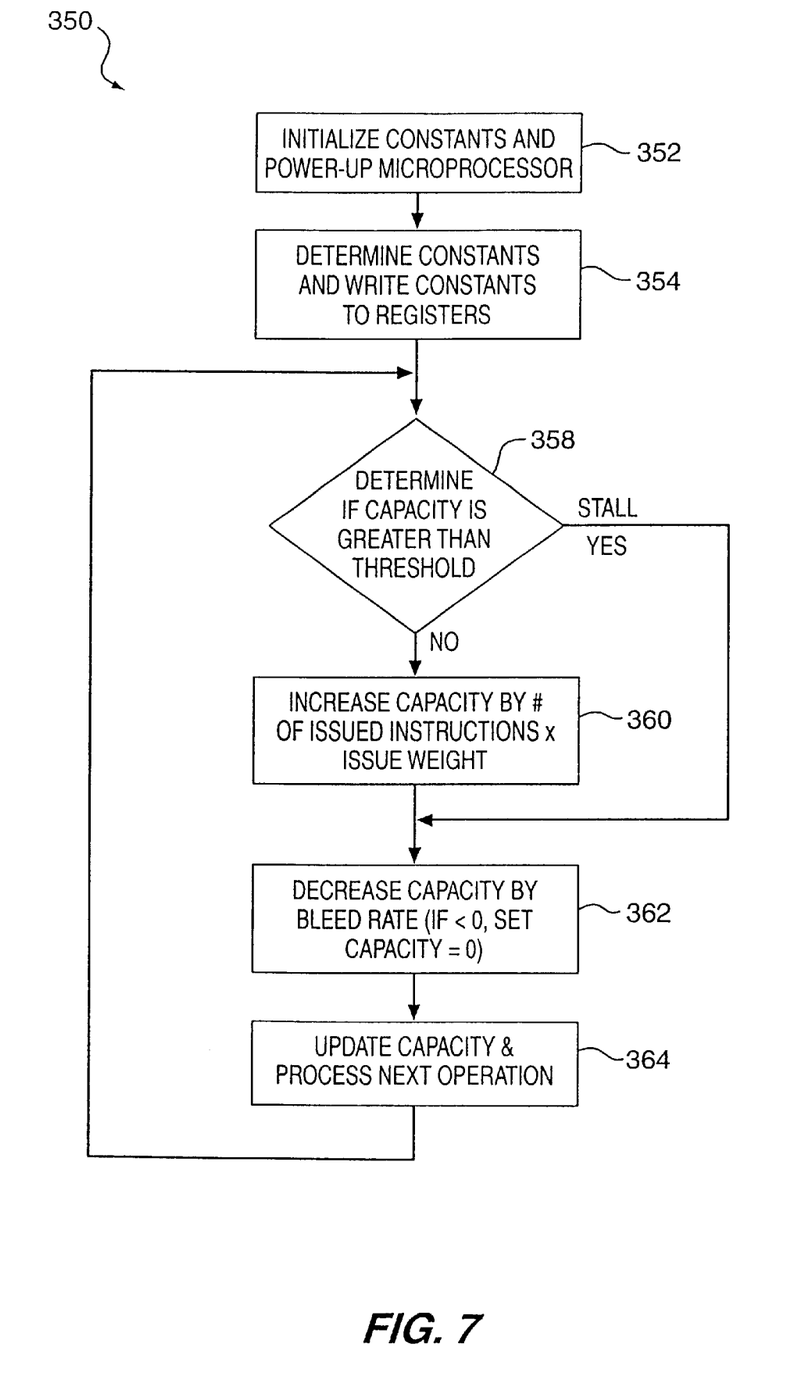
FIG. 7 shows a flowchart illustrating instruction stall operations to manage power dissipation accord with the invention.

FIG. 7 illustrates a flow chart 350 indicating certain methodologies of the invention. Step 352 shows the starting step, which involves powering processor 102 (FIGS. 3 and 4) and initializing system constants. Dependent on the operating environment, the system constants are then determined and written to registers 308, 317, 320 and 326 at step 354, FIG. 6. These constants are "pseudo static" in that they remain substantially identical throughout this power-on cycle and during the many instruction operations. Those skilled in the art should appreciate that operating software can however change the constants, as desired and during operation.

Step 358 determines whether the capacity is greater than threshold. If the answer is NO, then no stall operation occurs and step 360 proceeds; but if the answer is YES, a stall is inserted at the appropriate pipeline stage, as indicated, and step 360 is skipped. Step 360 thus increases the capacity of register 320 by multiplying the number of issued instructions issued by the issue weight indicating how much power is put into the processor. Step 362 however decreases the capacity of register 320 by the bleed rate. Finally, capacity is updated at step 364 and processing repeats back to step 358.

Figure 8:
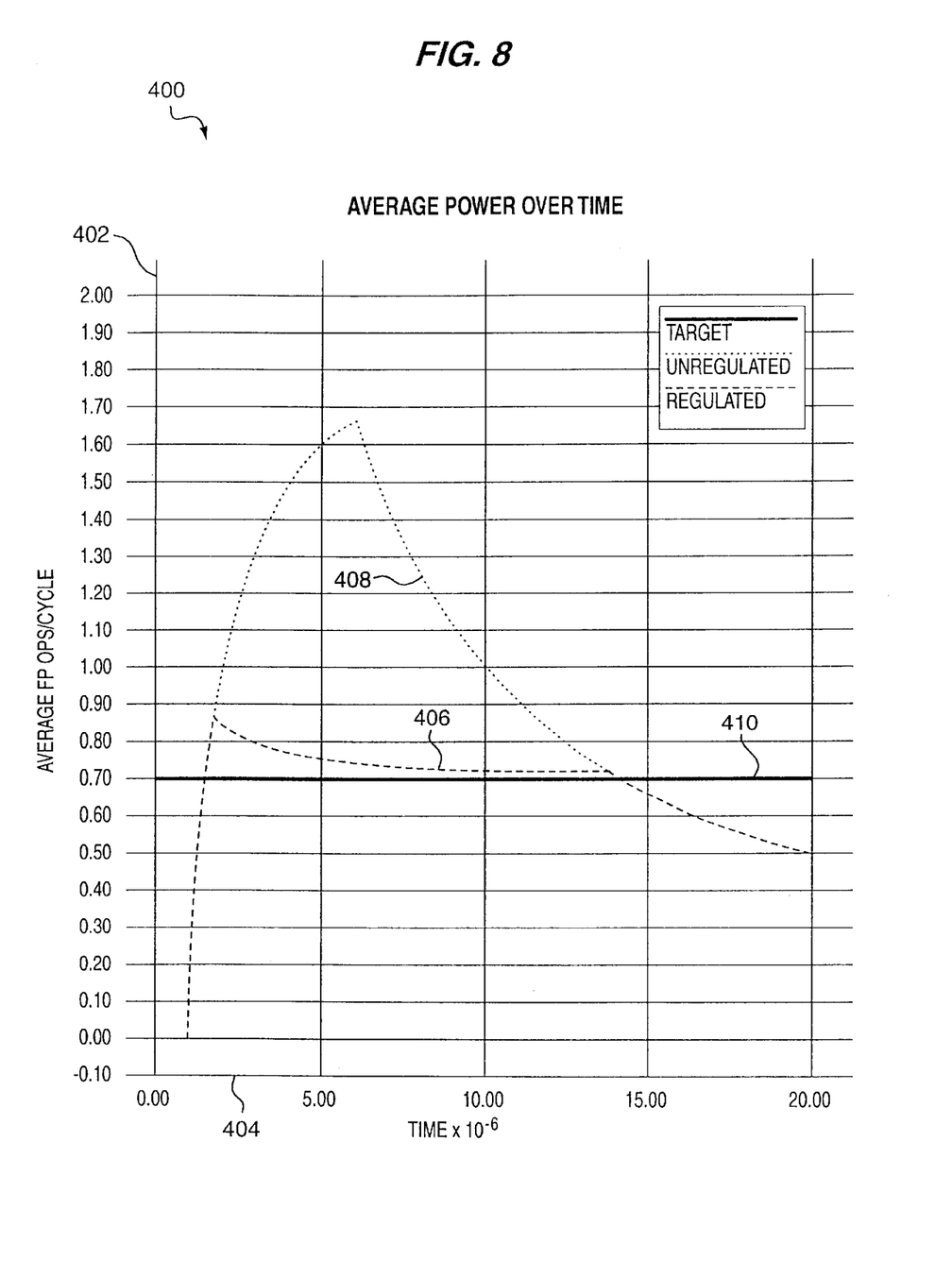
FIG. 8 shows a graph of average power, over time, for pipelined processors of the invention as compared to unregulated prior art pipelined processors.

FIG. 8 shows a graph 400 illustrating average power control characteristics of a pipelined processor with regulated control, as in FIG. 4, as compared to a prior art pipelined processor. Specifically, graph 400 has a Y-axis 402 denoting floating point operations per cycle, and a X-axis 404 denoting time. Data 406 corresponds to maximum average power dissipation over time for a regulated pipelined processor in accord with the invention; and data 408 corresponds to average power dissipation over time for an unregulated, prior art processor. Each data 406, 408 represent the same number of executed instructions relative to the bleed rate, shown as target data 410. Clearly the invention has advantages over the prior art in allowing full bandwidth for instruction processing until threshold is met, when regulation occurs. If after many cycles nothing is issued, capacity drops and instructions are issued at the full rate again. In addition, operations that include "bursts" of instructions may not impact performance.

The invention thus attains the objects set forth above, among those apparent from preceding description. Since certain changes may be made in the above systems and methods without departing from the scope of the invention, it is intended that all matter contained in the above description or shown in the accompanying drawing be interpreted as illustrative and not in a limiting sense.

In view of the foregoing, what is claimed is:

1. A method for controlling maximum average power dissipation in a pipelined processor, the pipelined processor of the type which processes instructions through pipelined stages, comprising the steps of
   determining a first power dissipation generated by issued instructions, by multiplying the issued instructions by an issue weight;
   determining a capacity as the first power dissipation subtracted by a bleed rate;
   comparing the capacity to a predetermined threshold; and
   stalling instructions at a select stage in the pipelined stages when the capacity exceeds the predetermined threshold.

2. A method of claim 1, further comprising estimating the issue weight as a function of instruction type, the issue weight being greater for instructions which dissipate greater energy within the processor.

3. A method of claim of 1, further comprising the step of writing one or more system constants into processor registers prior to the step of determining the first power dissipation, the constants including bleed rate, issue weight, and threshold.

4. A method of claim 3, further comprising specifying the constants wherein power dissipation is controlled to a maximum average output dissipation rate relative to a throttled instruction input rate.

5. A method of claim 1, further comprising resetting capacity to zero prior to processing instructions through the processor.

6. A method of claim 1, wherein the step of stalling comprises the step of asserting a lp-bit to a stage execution circuit within the processor.

7. A method of claim 6, further comprising the step of moving the lp-bit to a next stage execution circuit within the pipeline stages.

8. A method of claim 1, wherein the step of stalling comprises the step of changing a first stage execution circuit to a low power state.

9. A method of claim 8, further comprising the steps of (a) changing the first stage execution circuit to a higher power state and (b) changing a second stage execution circuit to a low power state, the second stage execution circuit being an adjacent downstream stage from the first stage execution circuit in the pipeline stages.

10. A pipelined processor, comprising:
    a register pipeline for processing instructions through pipeline states, the register pipeline having (a) a plurality of registers holding intermediate results between stages and (b) a plurality of stage execution circuits for executing instructions at associated states; and
    a power dissipation controller for changing one or more stage execution circuits to a low power state in order to control maximum average power dissipated by the pipelined processor in a time frame that is greater than pipeline length.

11. A processor of claim 10, wherein the time frame is at least $10^5$ greater than the pipeline length.

12. A processor of claim 10, wherein the power dissipation controller comprises a capacitive feedback to provide a maximum average output power dissipation rate and a controlled instruction input rate.

13. A processor of claim 12, wherein the controller comprises register memory for storing one or more system constants to provide the capacitive feedback.

14. A processor of claim 10, wherein the controller further comprises means for asserting a lp-bit to the one or more stage execution circuits in order to create the low power state.

15. A processor of claim 10, wherein the controller further comprises a capacity register, the capacity register storing a capacity, the controller comparing the capacity to a predetermined threshold to determine whether to implement the low power state in one or more stage execution circuits.

16. A processor of claim 10, wherein the controller further comprises one register for storing a bleed rate, one register for storing issue weights for instruction types, and one register for storing a threshold.

17. A processor of claim 16, wherein the controller comprises logic for multiplying issued instructions by associated issue weights, to determine a first power dissipation, and for subtracting the bleed rate from the first power dissipation as an update to capacity.

18. A processor of claim 17, wherein the logic further comprises means for comparing the threshold to the capacity, the controller implementing a low power state when the capacity exceeds the threshold.

* * * * *